Figure 1:
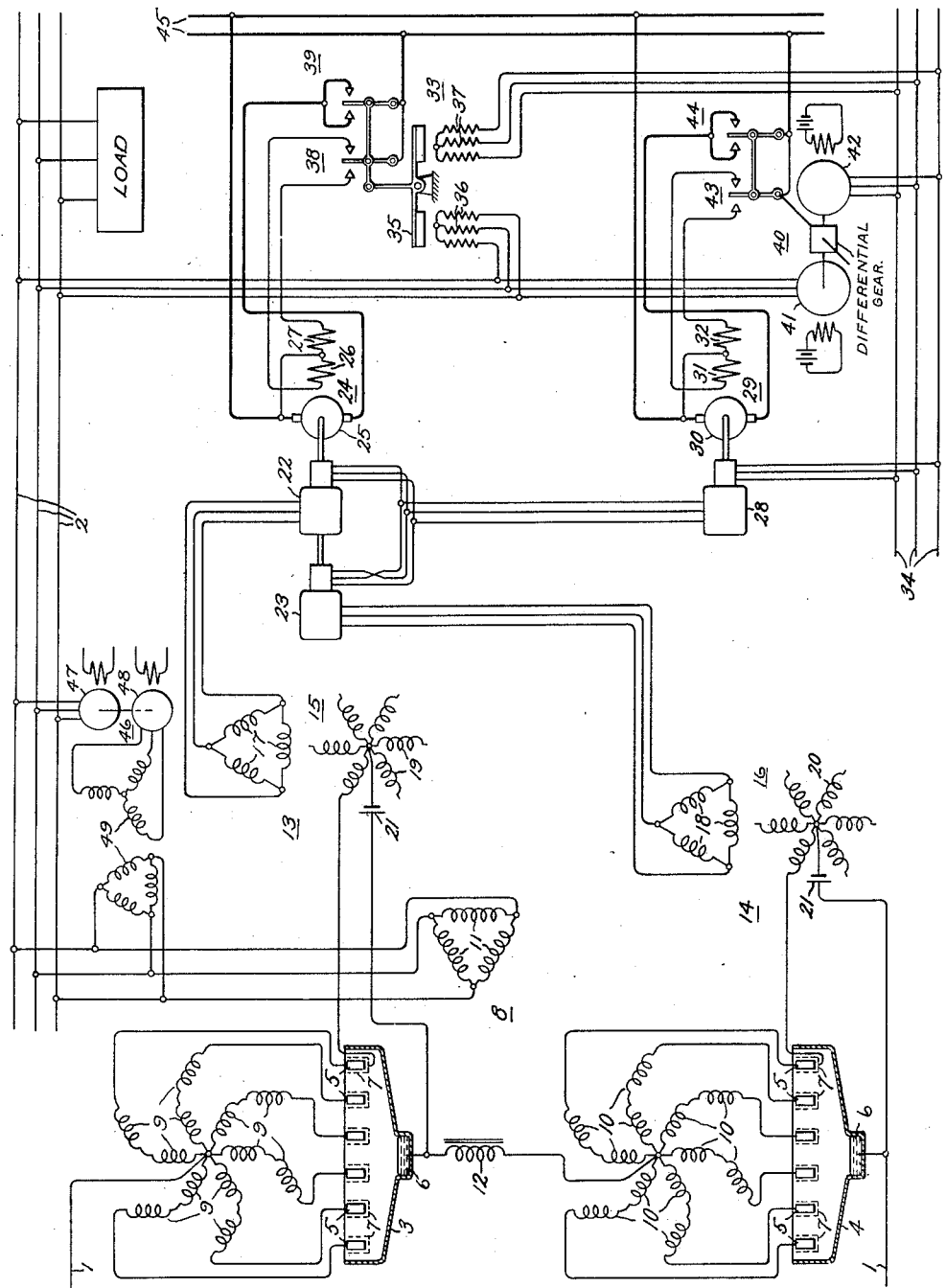

July 1, 1941.                H. PUPPE                    2,247,785
                 ELECTRIC VALVE TRANSLATING SYSTEM
             Filed April 29, 1939           2 Sheets-Sheet 2

VOLTAGE OF CIRCUIT 2.

VOLTAGE OF CIRCUIT 2.

Inventor:
Heinz Puppe, Deceased,
by William A. Dodge, Administrator,
by Harry E. Dunham
His Attorney.

Patented July 1, 1941

2,247,785

UNITED STATES PATENT OFFICE 2,247,785

ELECTRIC VALVE TRANSLATING SYSTEM

Heinz Puppe, deceased, late of Berlin-Reinickendorf, Germany, by William A. Dodge, administrator, Schenectady, N. Y., assignor to General Electric Company, a corporation of New York Application April 29, 1939, Serial No. 270,890
In Germany May 25, 1938

12 Claims. (Cl. 175—363)

This invention relates to electric valve translating systems and more particularly to electric valve inverters for transmitting power between constant current-direct current circuits and constant voltage-alternating current circuits.

Heretofore, there have been devised arrangements for transmitting power by means of high voltage direct current of constant value to a constant voltage alternating current circuit. Some of these arrangements have involved the use of networks of impedances, such as combinations of inductances and reactances commonly known as monocyclic networks, for effecting transformation of alternating current of constant value into alternating current of constant voltage. In accordance with the teachings of the invention described hereinafter, there is provided a new and improved electric valve translating system for supplying power to an alternating current circuit at constant voltage from a constant current-direct current circuit.

It is an object of the invention to provide a new and improved electric power transmission system.

It is another object of the invention to provide a new and improved electric valve translating system.

It is another object of the invention to provide a new and improved electric valve inverting system.

It is a further object of the invention to provide a new and improved electric valve system for transmitting power between a constant current-direct current circuit and a constant voltage-alternating current circuit.

It is a still further object of the invention to provide a new and improved control system for electric valve translating apparatus connected between a constant current-direct current circuit and a constant voltage-alternating current load circuit for transmitting power therebetween under variable load conditions.

It is a still further object of the invention to provide a new and improved method of operating electric valve apparatus which interconnects a direct current circuit and a constant voltage alternating current circuit.

Briefly described, in an illustrated embodiment of the invention, there is provided a plurality of electric valve inverters connected between a constant current-direct current circuit and a constant voltage-alternating current circuit for transmitting power to the alternating current circuit at constant voltage. A pair of electric valve inverters may be employed and each of these inverters may be of the controlled type. These electric valve inverters, which are energized from the direct current circuit, supply alternating currents of constant value which are combined by means of an associated inductive network to maintain the voltage of the alternating current circuit at a substantially constant value. The two components of alternating current produced by the respective electric valve inverters are adjustable or controllable in phase with respect to each other and with respect to the voltage of the alternating current circuit in accordance with load requirements. There is also disclosed a method for operating electric valve conversion equipment for transmitting energy between a constant current direct current circuit and a constant voltage alternating current circuit.

Figure 2:
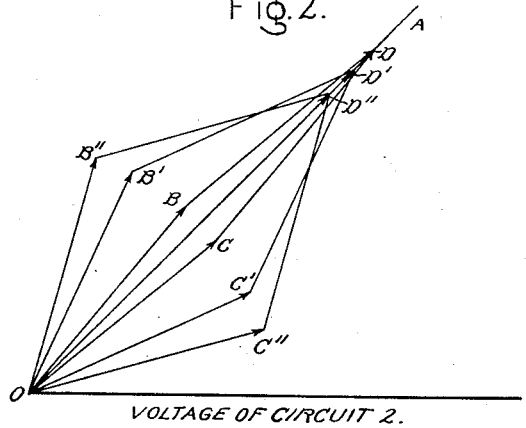
Figure 3:
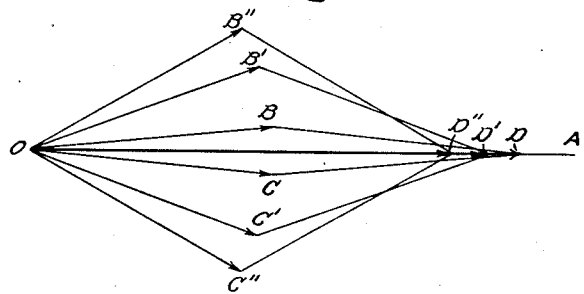
Figure 4:
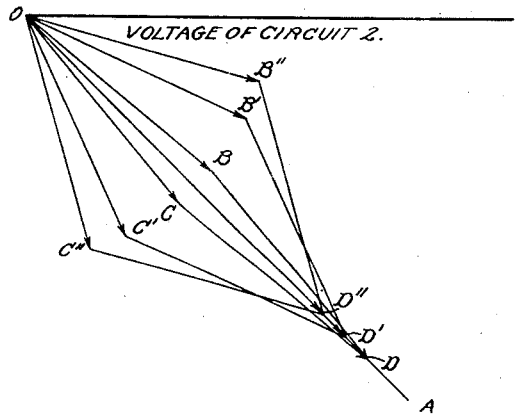
Figure 1:
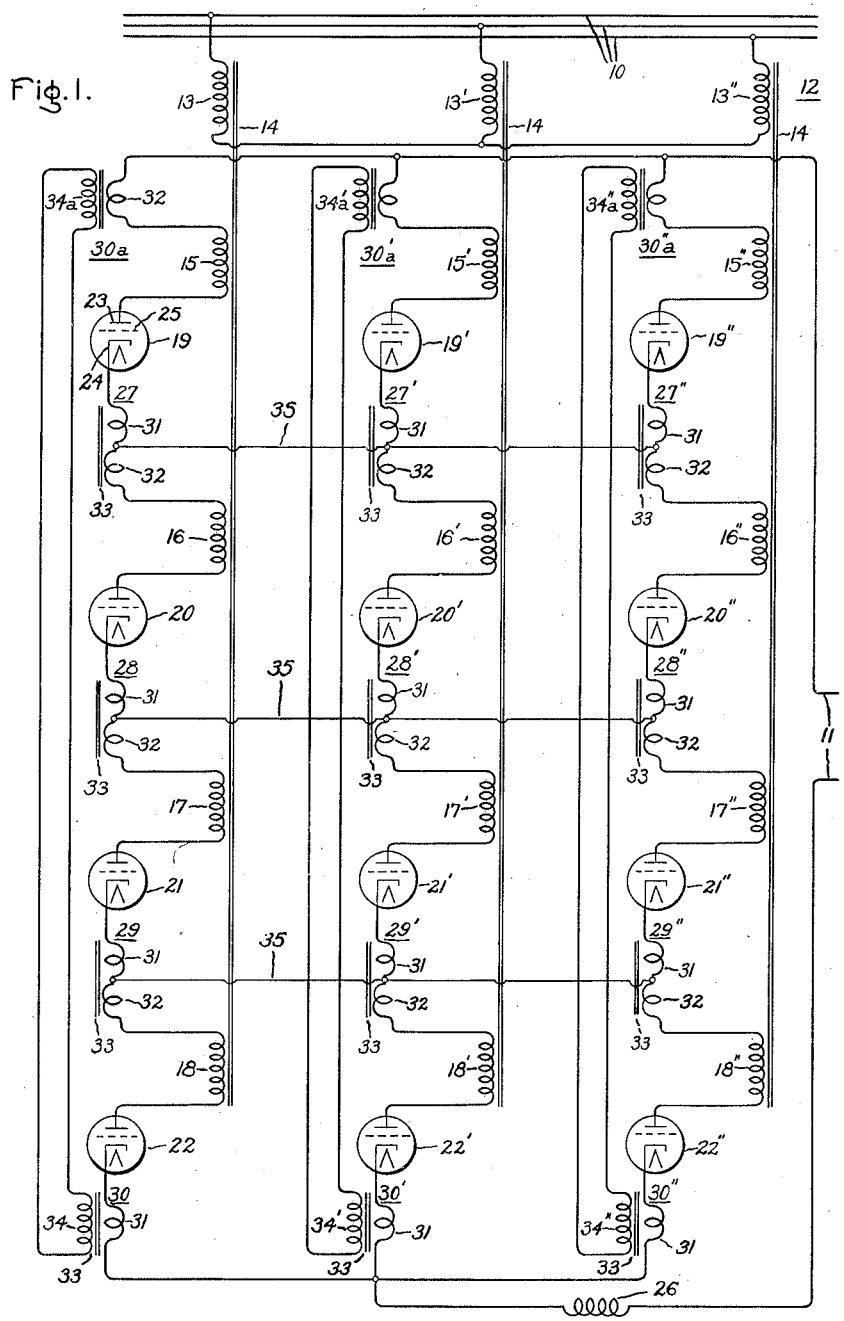

For a better understanding of the invention, reference may be had to the following description taken in connection with the accompanying drawings, and its scope will be pointed out in the appended claims. Fig. 1 diagrammatically illustrates an embodiment of the invention as applied to a system for energizing a constant voltage-alternating current load or distribution circuit from a constant current-direct current supply or transmission circuit, and Figs. 2, 3 and 4 represent certain operating characteristics thereof.

Referring now to Fig. 1 of the accompanying drawings, the invention is there diagrammatically illustrated as applied to an electric valve translating system for transmitting power between a constant current-direct current circuit 1 and a constant voltage-alternating current load circuit 2 through electric translating apparatus comprising electric valve means 3 and 4. The electric valve means 3 and 4 conjointly transmit power between circuits 1 and 2 and are preferably of the type employing an ionizable medium, such as a gas or a vapor, and each comprises a plurality of anodes 5, a self-reconstructing cathode such as a mercury pool cathode 6, and a plurality of control members 7 each associated with a different one of the anodes. The translating apparatus also includes a suitable inductive network, such as a transformer 8, which may comprise a plurality of groups of primary windings 9 and 10 and a secondary winding 11. Of course, the primary windings 9 and 10 and the secondary windings 11 are inductively associated. A smoothing reactance 12 may be connected between the electric valve means 3 and 4. While in the drawings the electric valve means 3 and 4 are shown as being connected in series relation with each other and with the constant current-direct current circuit 1, it is to be understood that the electric valve means 3 and 4 may be operated in parallel relationship, if desired.

In order to control the conductivities of the electric valve means 3 and 4 for inverter operation for energizing the alternating current circuit 2 from the direct current circuit 1, excitation circuits 13 and 14 are provided and associated with electric valve means 3 and 4, respectively. Excitation circuits 13 and 14 impress on the control members of electric valve means 3 and 4 suitable periodic voltages, such as alternating voltages of predetermined phase displacement, to determine the phase relationship of the output current delivered by the electric valve means. Excitation circuits 13 and 14 may comprise transformers 15 and 16, respectively, having primary windings 17 and 18 and a plurality of secondary windings 19 and 20, respectively. A suitable source of negative unidirectional biasing potential, such as a battery 21, may be connected between the neutral point of the secondary windings 19 and 20 and the cathodes 6 of the electric valve means 3 and 4.

As an agency for controlling the voltages impressed on the control members 7 of the electric valve means 3 and 4 so that the electric valve means 3 and 4 produce alternating currents of constant value having predetermined phase displacement with respect to each other, suitable voltage controlling devices such as phase shifters 22 and 23 are associated with excitation circuits 13 and 14, respectively. The phase shifters 22 and 23 may be of the rotary type having distributed primary and secondary windings and may impress on these excitation circuits polyphase systems of voltages. The rotary phase shifters 22 and 23 may be mechanically interconnected, and these phase shifting devices may be automatically operated by means of a motor 24 having an armature 25 mechanically coupled to the rotating members of the phase shifters and having a pair of field windings 26 and 27. The angular position of the rotary phase shifters 22 and 23, and hence the relative phase displacement of the alternating voltages impressed on the excitation circuits 13 and 14, controls the magnitude of the resultant alternating current supplied by the electric valve means 3 and 4.

To control the phase of the resultant output current of the electric valve means 3 and 4 with respect to the voltage of the alternating current circuit 2 or with respect to any other predetermined electrical condition of the load circuit 1, a suitable voltage controlling device, such as a phase shifter 28, is provided and which also may be of the rotary type having distributed primary and secondary windings. The rotary phase shifter 28 may be automatically operated by a suitable controlling means, such as a direct current motor 29 having an armature 30 and a pair of field windings 31 and 32.

Apparatus is provided for controlling the operation of the electric valve means 3 and 4 in order to transmit power to the alternating current circuit 2 under variable load conditions and at constant voltage. In order to maintain the voltage of the alternating current circuit 2 constant and in order to maintain the frequency of circuit 2 constant under variable load conditions, means is provided for automatically controlling the phase of the respective constant current components of alternating current delivered by the electric valve means 3 and 4. This control apparatus operates on the excitation circuits 13 and 14 through rotary phase shifters 22 and 23 and 28. More specifically, a suitable relay 33 is provided which is responsive to the voltage of the alternating current circuit 2 to control the operation of the rotary phase shifters 22 and 23. In the event it is desired to obtain a voltage standard against which the voltage of circuit 2 is compared, a circuit 34 may be employed as a reference voltage or a reference frequency. Circuit 34 may be energized from any suitable source which is capable of maintaining a constant voltage and a constant frequency. Relay 33 may comprise an armature 35 and a pair of groups of actuating windings 36 and 37. Winding 36 are energized in response to circuit 2, and windings 37 are energized from circuit 34. Armature 35 may actuate switches 38 and 39 which are connected in the field and armature circuits, respectively, of the direct current motor 24 and control of the direction and amount of rotation of the armature member 25.

In addition, means is provided for controlling the conductivities of the electric valve means 3 and 4 in response to the power demanded by the circuit. The control system automatically controls the phase of the resultant current furnished by the electric valve means 3 and 4 in response to the load requirements of the system. More specifically, a load responsive device may be employed, such as a frequency responsive circuit 40, which may include a pair of synchronous motors 41 and 42, the former of which is connected to be energized from the load circuit 2 and the latter of which is connected to be energized from the source of standard frequency 34. The synchronous motors 41 and 42 are interconnected through a differential gear which operates a pair of switches 43 and 44 which are connected to the field and armature windings of the direct current motor 29 and control the direction and amount of rotation thereof. The direct current motors 24 and 29 may be energized from any suitable source of current, such as the direct current source 45.

In the event it is required to supply a commutating potential to the alternating current output circuits of the electric valve means 3 and 4, any suitable arrangement for supplying the reactive kva. required for this purpose may be employed. For example, a motor generator set of the requisite size is provided and which comprises a motor 47, a generator 48 the output of which is inductively coupled to the transformer and through transformer 49. Of course, it is to be understood that other suitable commutating arrangements, such as banks of capacitances or an over-excited dynamo-electric machine of the synchronous type, or a synchronous condenser, may be employed.

The operation of the embodiment of the invention shown in Fig. 1 will be explained by considering the system when it is operating to transmit power from the constant current-direct current circuit 1 to the alternating current circuit 2 at constant voltage. Inasmuch as the electric valve means 3 and 4 are energized from a constant current-direct current circuit, the alternating current outposts of each of these electric valve means operating as inverters will, of course, be of constant value. That is, the output current is constant. Hereinafter in the discussion of the operation of the system, reference will be made to only one output current for each electric valve means. It is to be understood that each of the electric valve means 3 and 4 produces a three-phase output system of currents, the root mean square value of each phase current being maintained constant at all times. Due to the phase of the alternating voltages impressed on the excitation circuits 13 and 14, the output currents of the electric valve means 3 and 4 are displaced in phase and by virtue of the inductive interconnections of windings 9, 10 and 11, the corresponding phase currents of the respective electric valve circuits are combined. In the particular arrangement shown, the respective components of current provided by the electric valve inverters 3 and 4 are added vectorially and the resultant current of each phase acts on the transformer 8.

Due to the initial adjustment of the rotary phase shifters 22 and 23, the phases of the output currents of the electric valve inverters 3 and 4 are maintained in a predetermined relationship. Under varying load conditions, the relative phase displacement between the respective constant current components is controlled or adjusted to control the magnitude of the resultant current transmitted to the respective phases of the transformer windings. Furthermore, as the load on the system varies, the phase of the resultant or vector sum of the alternating components is automatically adjusted or controlled in response to load by means of the rotary phase shifter 28. It is to be understood that the adjustment of the phase of the relative phase displacement between the output current vectors of electric valve means 3 and 4, and the phase relationship between these vectors and the voltage of circuit 2, are accomplished simultaneously by means of the rotary phase shifters 22 and 23 and rotary phase shifter 28 which, of course, are actuated by relay 33 and the frequency responsive circuit 40, respectively.

If it be assumed that the load on the system increases, effecting a temporary decrease in the voltage of circuit 2, motor 24 will be energized to operate the rotary phase shifters 22 and 23 to cause a decrease in the phase displacement between the output current vectors of electric valve inverters 3 and 4, thereby effecting an increase in the primary ampere-turns of the transformer 8. Of course, the voltage of circuit 2 will be restored to the desired value. On the other hand, if the load on the system decreases substantially, motor 24 will move in the opposite direction to increase the phase displacement between the output current vectors of electric valve inverters 3 and 4 to decrease the resultant primary ampere-turns acting on transformer 8. Accordingly, the voltage of circuit 2 will be lowered to the desired value.

If the frequency of the alternating current circuit 2 departs from the desired value, the frequency responsive circuit 40 will operate the motor 29 to rotate the phase of the resultant output current of electric valve means 3 and 4 so that the resultant primary ampere-turns of the transformer 8 have the desired phase relationship with respect to the current flowing in the alternating current circuit 2. Of course, it is to be understood that as the power factor of the circuit 2 varies, the load imposed on the system also varies and the frequency of the system will tend to depart from the desired value if means are not provided to compensate for the variation in power. The frequency responsive circuit 40 automatically controls the phase of the resultant primary ampere-turns of transformer 8 to meet varying load and power factor conditions.

The operation of the embodiment of the invention shown in Fig. 1 may be more fully explained by considering the vectors shown in Figs. 2, 3 and 4. These figures show the vector relationship between the output currents of the electric valve inverters 3 and 4 under varying load conditions for leading power factor, unity power factor, and lagging power factor loads. Considering Fig. 2 in particular, the vector OA represents the axis of the resultant primary ampere-turns of the transformer 8 for a load of fixed power factor. Of course, in Figs. 3 and 4 the vector OA has been rotated to an in-phase and a lagging position with respect to the voltage of circuit 2. Vectors OB and OC represent the alternating current output of rectifiers 3 and 4, respectively. The vector OD represents the vector sum of the output currents of electric valve means 3 and 4 and represents the resultant primary ampere-turns per phase impressed on transformer 8. As the load on the system decreases, it is to be understood that the excitation circuits 13 and 14 are controlled by phase shifters 22 and 23, which shift the voltages impressed on the control members 7 in opposite directions but through equal angles, to increase the phase displacement between the vectors OB and OC to positions OB', OC', OB'' and OC''. In this manner it is to be understood that by controlling the phase displacement between the output currents of the electric valve means 3 and 4, the phase of the primary ampere-turns of transformer 8 is controlled. Furthermore, it is emphasized that as the power factor and hence the load of the circuit 2 varies, the axis OA also varies in phase with respect to the voltage of circuit 2 and may be brought to an in-phase relationship or a lagging relationship, depending upon the nature of the connected load.

While the invention has been shown and described as applied to a particular system of connections and as embodying various devices diagrammatically shown, it will be obvious to those skilled in the art that changes and modifications may be made without departing from the invention, it is, therefore, the aim in the appended claims to cover all such changes and modifications as fall within the true spirit and scope of the invention.

What is claimed as new and desired to be secured by Letters Patent of the United States is:

1. In combination, a constant current-direct current circuit, an alternating current circuit, a pair of electric valve means energized from said direct current circuit for producing alternating components of current of constant value, an inductive network energized in accordance with a resultant of said alternating components of current, means for controlling the conductivities of said electric valve means to control the phase displacement of said components of alternating current and to control thereby the magnitude of the resultant current, and means for controlling the phase of said resultant current with respect to the voltage of said alternating current circuit to transmit power to said alternating current circuit at constant voltage.

2. In combination, a constant current-direct current circuit, a constant voltage-alternating current circuit, electric translating apparatus connected between said circuits and comprising a pair of electric valve means for conjointly energizing said constant voltage-alternating current circuit, said electric valve means having control members for controlling the conductivities there- July 1, 1941.  R. TRÖGER ET AL  2,247,793

ELECTRIC VALVE CONVERTING SYSTEM

Filed June 21, 1939  2 Sheets-Sheet 1

Inventors:
Richard Tröger,
Otto Renner,
by Harry E. Dunham
Their Attorney.